(12) United States Patent
Yukawa et al.

(10) Patent No.: US 11,518,200 B2
(45) Date of Patent: Dec. 6, 2022

(54) PNEUMATIC TIRE WITH NOISE DAMPER

(71) Applicant: SUMITOMO RUBBER INDUSTRIES, LTD., Hyogo (JP)

(72) Inventors: Naoki Yukawa, Hyogo (JP); Toshiaki Suzuki, Hyogo (JP); Takuya Sato, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 1106 days.

(21) Appl. No.: 16/144,312

(22) Filed: Sep. 27, 2018

(65) Prior Publication Data

US 2019/0100061 A1 Apr. 4, 2019

(30) Foreign Application Priority Data

Oct. 2, 2017 (JP) .............................. JP2017-192903

(51) Int. Cl.
| | | |
|---|---|---|
| *B60C 19/00* | (2006.01) | |
| *B29D 30/06* | (2006.01) | |
| *B29D 30/00* | (2006.01) | |
| *B60C 5/00* | (2006.01) | |

(52) U.S. Cl.
CPC ........ *B60C 19/002* (2013.01); *B29D 30/0061* (2013.01); *B29D 30/0681* (2013.01); *B60B 2900/133* (2013.01)

(58) Field of Classification Search
CPC ..... B60C 19/002; B60C 19/00; B60C 19/122; B60C 5/00; B29D 30/0061; B29D 30/0681; B60B 2900/133
See application file for complete search history.

(56) References Cited

U.S. PATENT DOCUMENTS

| | | | | |
|---|---|---|---|---|
| 8,136,560 | B2 * | 3/2012 | Tanno | ................... B60C 19/002 |
| | | | | 152/157 |
| 2003/0020320 | A1 | 1/2003 | Yukawa et al. | |
| 2006/0108042 | A1 * | 5/2006 | Yukawa | .................... B60B 3/04 |
| | | | | 181/208 |

(Continued)

FOREIGN PATENT DOCUMENTS

| | | | | |
|---|---|---|---|---|
| CN | 110039964 | A * | 7/2019 | |
| DE | 102015212484 | A1 * | 1/2017 | ........... B29C 73/163 |

(Continued)

OTHER PUBLICATIONS

Official Communication issued in European Patent Office (EPO) Patent Application No. 18191224.7, dated Feb. 12, 2019.

*Primary Examiner* — Edgardo San Martin
(74) *Attorney, Agent, or Firm* — Greenblum & Bernstein, P.L.C.

(57) ABSTRACT

A pneumatic tire is provided with a noise damper made of a sponge material attached to a radially inner surface of the tread portion. The noise damper has protruding portions protruding from a radially inner surface of a band-shaped base portion. The protruding portions extend from one edge to the other edge of the base portion in the widthwise direction, and arranged at intervals in the tire circumferential direction. In a cross section of the tire parallel with the tire equatorial plane, the radially inner surface of each of the protruding portions includes a flat portion, and the radially inner surface of the base portion includes an arc portion parallel with the inner surface of the tread portion.

20 Claims, 9 Drawing Sheets

(56) References Cited

U.S. PATENT DOCUMENTS

| | | | |
|---|---|---|---|
| 2006/0185777 A1 | 8/2006 | Tanno | |
| 2008/0099117 A1* | 5/2008 | Tanno | B60C 19/002 152/454 |
| 2009/0277549 A1* | 11/2009 | Tanno | B60C 19/002 152/157 |
| 2010/0043937 A1* | 2/2010 | Matsunaga | B60C 19/002 152/564 |
| 2011/0220264 A1* | 9/2011 | Nagai | B60C 11/00 156/123 |
| 2016/0339749 A1* | 11/2016 | Yukawa | B60C 19/002 |
| 2019/0184769 A1* | 6/2019 | Yukawa | B60C 19/002 |
| 2020/0001666 A1* | 1/2020 | Sakakibara | B60C 19/002 |
| 2020/0062046 A1* | 2/2020 | Sakakibara | B60C 19/002 |
| 2020/0130431 A1* | 4/2020 | Hasegawa | B60C 19/002 |
| 2021/0221184 A1* | 7/2021 | Stuckey | B60C 19/002 |

FOREIGN PATENT DOCUMENTS

| | | | | |
|---|---|---|---|---|
| EP | 3072833 A1 * | 9/2016 | | B60B 3/001 |
| JP | 3622957 | 12/2004 | | |
| JP | 2006182280 A * | 7/2006 | | B60C 19/002 |
| JP | 2006-341629 | 12/2006 | | |
| JP | 2017154543 A * | 9/2017 | | B60C 19/002 |
| WO | WO-2005012008 A1 * | 2/2005 | | B60C 19/002 |
| WO | WO-2015118707 A1 * | 8/2015 | | B60C 19/002 |

* cited by examiner

PNEUMATIC TIRE WITH NOISE DAMPER

TECHNICAL FIELD

The present invention relates to a pneumatic tire provided with a noise damper improved in the road noise reducing effect.

BACKGROUND ART

In Japanese Patent No. 3622957, there is disclosed a pneumatic tire provided with a noise damper made of a sponge material and adhered to the inner surface of the tread portion. In this tire, the radially inner surface of the noise damper has a concavo-convex surface in which reentrant portions and protruding portions are repeated in the tire circumferential direction.

This concavo-convex surface increases the surface area of the sponge material contacting with the sound wave, and moderates the sound reflection, and thereby its effect to suppress resonance of the tire cavity is enhanced.

However, from the viewpoint of the effect to further suppress the tire cavity resonance, there is still room to study on the shape of the concavo-convex surface.

SUMMARY OF THE INVENTION

Problems to be Solved by the Invention

It is an object of the present invention to provide a pneumatic tire with a noise damper of which road noise reducing effect is further enhanced by improving the concavo-convex surface of the noise damper.

According to the present invention, a pneumatic tire with a noise damper comprises a pneumatic tire and a noise damper made of a sponge material and extending in the tire circumferential direction on an inner surface of the tread portion of the pneumatic tire, wherein the noise damper comprises a band-shaped base portion having a radially outer surface adhered to the inner surface of the tread portion, and a plurality of protruding portions protruding from the radially inner surface of the base portion, the protruding portions form ribs extending continuously from one edge to the other edge of the base portion in the widthwise direction, and arranged at intervals in the tire circumferential direction, in a cross section of the tire parallel with the tire equatorial plane, the radially inner surface of the base portion includes arc surface portions concentric with the inner surface of the tread portion, and the radially inner surface of each of the protruding portions includes a flat surface portion facing the tire axis (rotation axis).

It is preferable that the distance in the tire circumferential direction between the protruding portions adjacent in the tire circumferential direction is 20 to 80 mm at the radially outer ends of the protruding portions.

It is preferable that each of the protruding portions has a rectangular cross-sectional shape in the cross section perpendicular to the longitudinal direction of the protruding portion.

It is preferable that each of the protruding portions extends linearly from the above-said one edge to other edge at an angle θ of 20 to 90 degrees with respect to the tire circumferential direction, or is curved in an arc from the above-said one edge to other edge.

It is preferable that the protruding height of the protruding portions from the base portion is in a range from 5 to 26 mm.

It is preferable that the thickness of the base portion is in a range from 2 to 15 mm.

It is preferable that the noise damper is attached to the inner surface of the tread portion via a puncture sealant layer for preventing tire puncture.

In the present invention, as described above, rib-like protruding portions of the noise damper extend continuously in the width direction and arranged at intervals in the tire circumferential direction. As a result, reentrant portions are formed between protruding portions adjacent in the circumferential direction. Thus, when the air in the tire cavity flows in the circumferential direction, a part of the air enters the reentrant portions and becomes a vortex flow and goes out from the reentrant portions. At this time, the air flowing in the circumferential direction is disturbed.

DESCRIPTION OF THE PREFERRED EMBODIMENTS

Embodiments of the present invention will now be described in detail in conjunction with accompanying drawings.

According to the present invention, a pneumatic tire with noise damper T comprises a pneumatic tire 1 and a noise damper 20 attached thereto.

Figure 1:
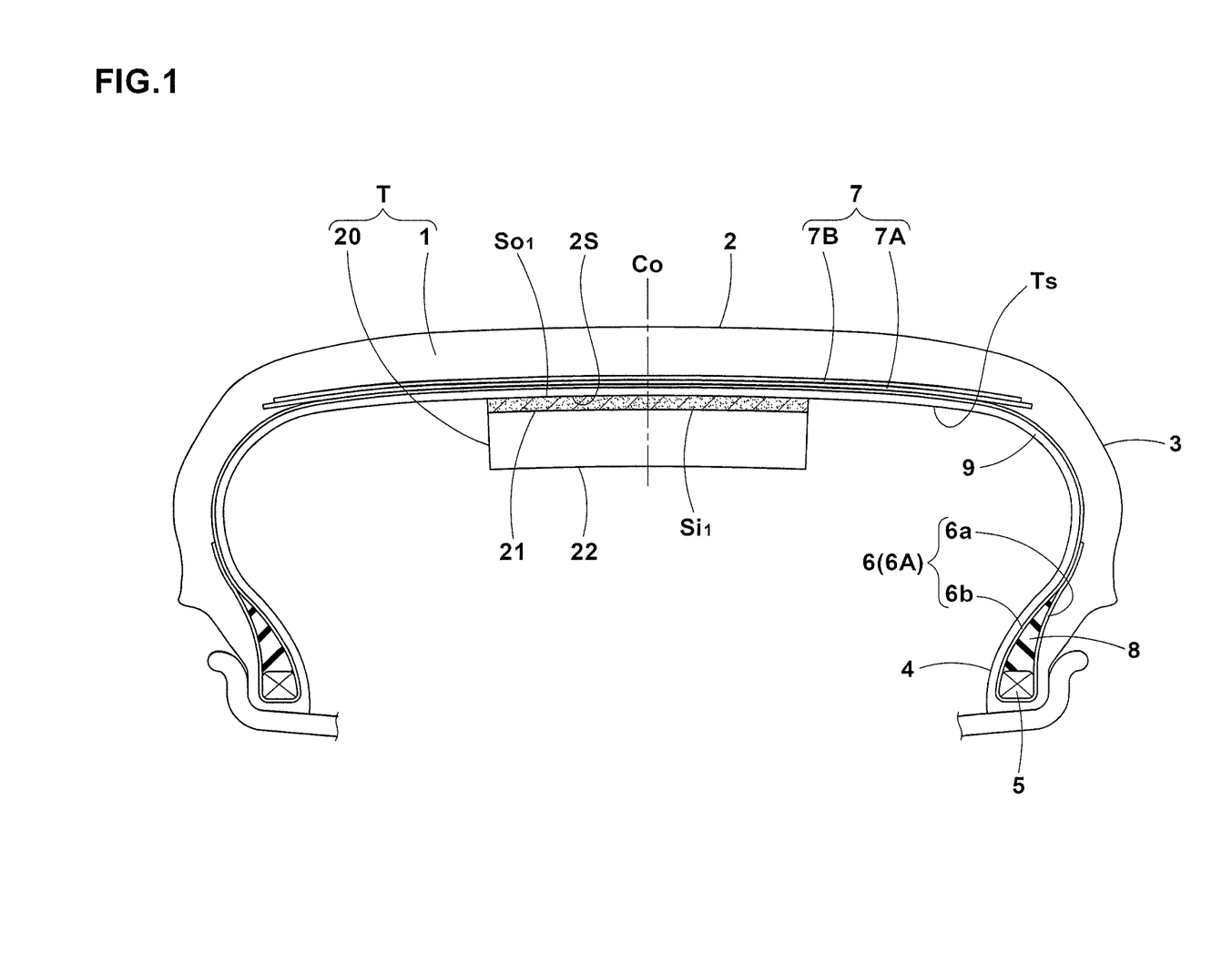
FIG. 1 is a meridian cross sectional view of a pneumatic tire with noise damper as an embodiment of the present invention.

As shown in FIG. 1 which shows an embodiment of the present invention, the pneumatic tire 1 comprises a tread portion 2 whose radially outer surface defines the tread, a pair of axially spaced bead portions 4 mounted on rim seats, a pair of sidewall portions 3 extending between the tread edges and the bead portions 4, a carcass 6 extending between the bead portions 4 through the tread portion 2 and the sidewall portions 3, and a tread reinforcing belt 7 disposed radially outside the carcass 6 in the tread portion 2.

The carcass 6 is composed of at least one ply 6A of cords arranged radially at an angle in the range of from 75 to 90 degrees for example with respect to the tire equator co, extending between the bead portions 4 through the tread portion 2 and sidewall portions 3 and turned up around a bead core 5 in each bead portion 4 from the axially inside to the axially outside of the tire so as to form a pair of turnup portions 6b and a main portion 6a therebetween. In this example, the carcass 6 is composed of a single ply 6A of cords arranged radially at an angle of 90 degrees with respect to the tire equator co.

The bead portions 4 are each provided between the main portion 6a and turned up portion 6b of the carcass ply 6A with a bead apex 8 made of a hard rubber extending radially outwardly from the bead core 5 in a tapered manner in order to reinforce the bead portion 4.

The belt 7 comprises at least two cross breaker plies 7A and 7B of high modulus cords laid at an angle of from 10 to 40 degrees for example with respect to the tire equator co; and optionally a band ply of a cord or cords wound on the radially outside of the breaker at a smaller angle with respect to the tire equator Co.

on the inside of the carcass 6, there is disposed an inner liner rubber layer 9 forming a tire cavity surface Ts, namely, an inner surface of the tire facing the tire cavity. The inner liner rubber layer 9 is made of rubber having air impermeability such as butyl rubber, and keeps the tire internal pressure.

The noise damper 20 is attached onto the radially inner surface 2s of the tread portion 2 constituting a part of the tire cavity surface Ts, and extends in the tire circumferential direction.

Figure 2:
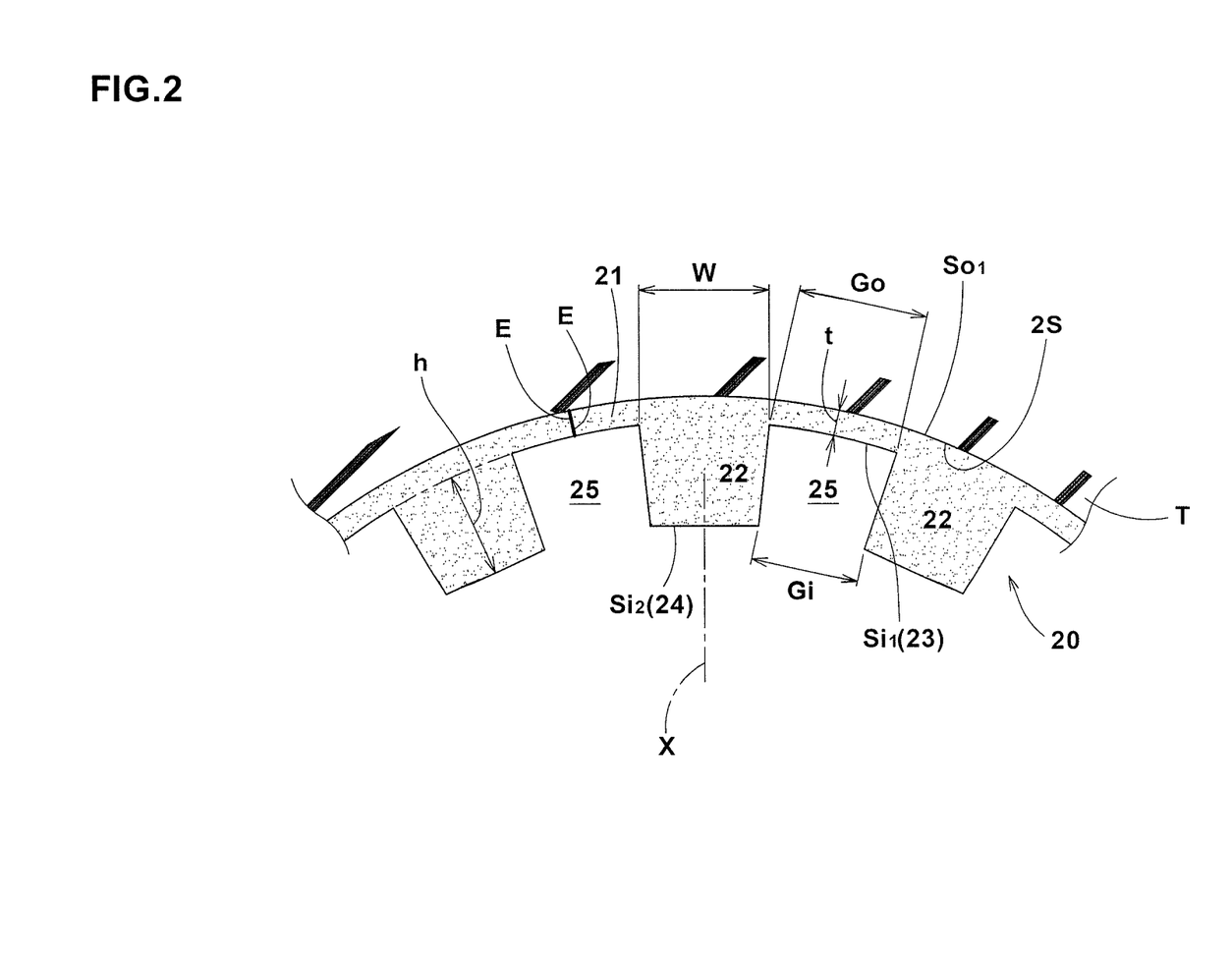
FIG. 2 is a latitudinal cross section at the tire equator schematically showing a part of the noise damper by exaggerating the curvature.
Figure 3A:
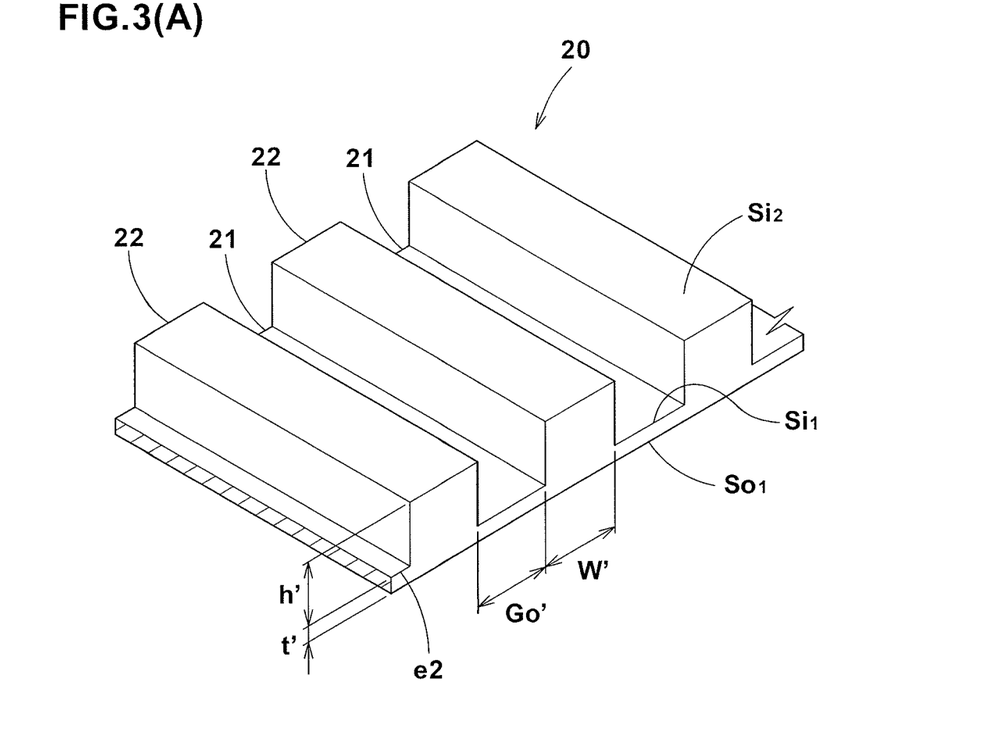
FIG. 3(A) is a perspective view of the noise damper before attached to the pneumatic tire.
Figure 3B:
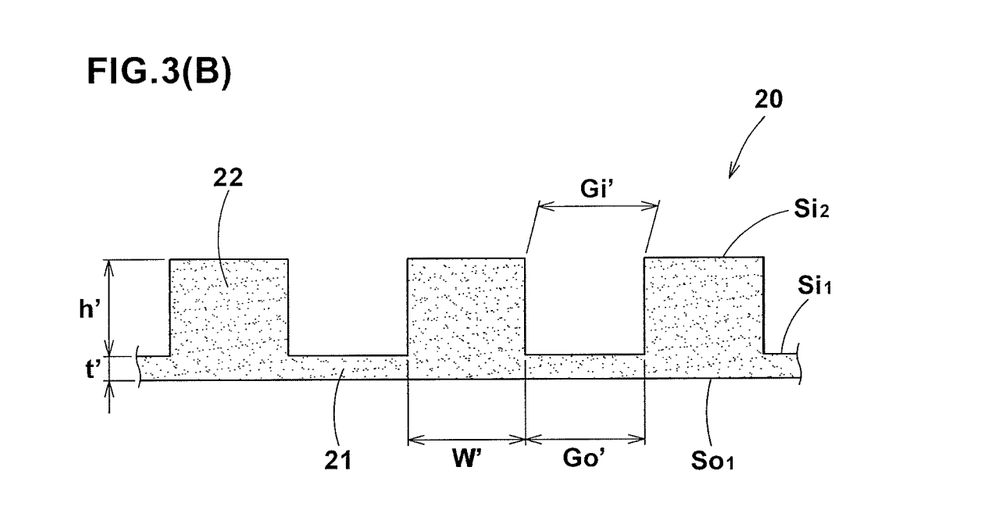
FIG. 3(B) is a cross sectional view thereof taken along the longitudinal direction.

The noise damper 20 comprises a band-like base portion 21 having a radially outer surface So1 attached to the radially inner surface 25 of the tread portion 2, and protruding portions 22 protruding from a radially inner surface Si1 of the base portion 21 as shown in FIGS. 2 and 3.

In the noise damper 20 in this example, both ends E in the tire circumferential direction are butted against each other as shown in FIG. 2. Thereby, it is formed as an annular body continuing in the tire circumferential direction.

However, it is also possible that the ends E are spaced apart from each other. In this case, it is preferred that the distance between both ends E in the tire circumferential direction is 80 mm or less from the viewpoint of weight balance. And both ends E are positioned in the base portion 21, not the protruding portions 22. If both ends E are positioned in the protruding portions 22, there is a possibility that damage such as cracking occurs at the ends E due to stress acting on the adhering surface and the end surface during rolling.

The noise damper 20 is formed from a sponge material. As to the sponge material, a foam obtained by foaming rubber or synthetic resin is suitably used.

Examples of the rubber foam include a chloroprene rubber sponge, an ethylene propylene rubber sponge, and a nitrile rubber sponge. Examples of synthetic resin foams include polyurethane sponges (e.g., ether polyurethane sponge, ester polyurethane sponge, polyether/ester polyurethane sponge, etc.) and polyethylene sponges (e.g., polyethylene sponge and the like).

In particular, the polyether/ester polyurethane sponge is preferable from the viewpoints of durability and quality stability.

In the noise damper 20, its bubbles on the surface and in the inside thereof convert the energy of vibration of the air oscillating the tire cavity into heat energy to be consumed. Thus, the cavity resonance energy can be reduced, that is, the cavity resonance sound can be absorbed to reduce the road noise.

Preferably, the sponge material has a density of from 10 to 60 kg/cu·m. If the density is below 10 kg/cu·m, the sound absorption effect by the inside of the sponge material reduces. If the density exceeds 60 kg/cu·m, the sound is easily reflected at the surface of the sponge material, and the sound absorption effect by the surface of the sponge material becomes reduced. In any case, the effect of reducing the road noise is lowered. Therefore, it is preferable that the density is set to be not less than 20 kg/cu·m, but not more than 40 kg/cu·m.

The base portion 21 of the noise damper 20 has a strip shape with a constant thickness as shown in FIGS. 2 and 3, and the radially outer surface So1 of the base portion 21 is adhered to the radially inner surface 25 of the tread portion 2. Accordingly, the radially inner surface Si1 of the base portion 21 has arc surface portions 23 curved along the radially inner surface 25 of the tread portion 2. Thus, they are concentric with each other in a cross section of the tire parallel with the tire equatorial plane.

The protruding portions 22 form ribs extending continuously from one edge e1 to the other edge e2 of the base portion 21 in the width direction, and are arranged at equal intervals in the tire circumferential direction.

In a cross section of the tire parallel with the tire equatorial plane (shown in FIG. 2), the radially inner surface Si2 of each of the protruding portions 22 includes a flat surface portion 24 facing the tire axis.

Here, the expression "facing the tire axis" means that the perpendicular bisector X of the flat surface portion 24 passes through the tire axle.

Figure 6A:
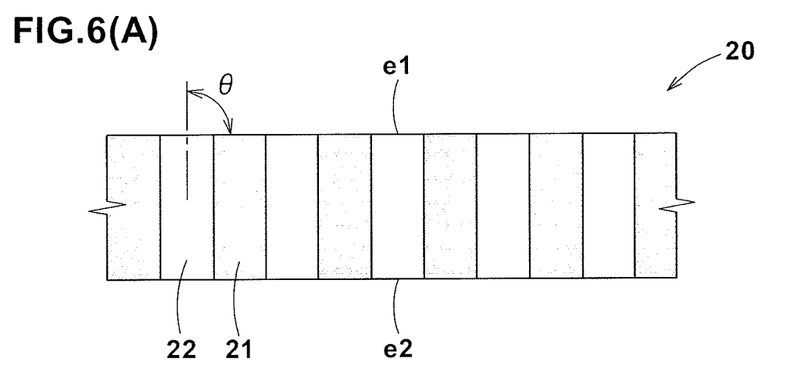
FIGS. 6(A), 6(B) and 6(C) are diagrams showing examples of the arrangement of protruding portions of the noise damper.

In this example, as shown in FIG. 6(A), the protruding portions 22 extend linearly at an angle θ of 90 degrees with respect to the tire circumferential direction.

Figure 6B:
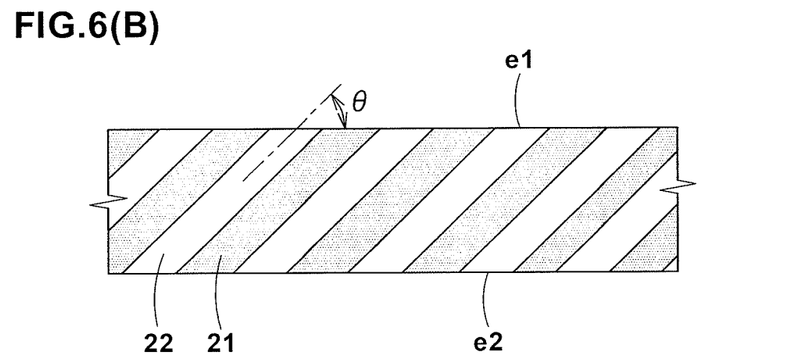

However, as shown in FIG. 6(B), the protruding portions 22 may be inclined at an angle θ smaller than 90 degrees with respect to the tire circumferential direction.

In each of the protruding portions 22, its shape in the cross-section perpendicular to the longitudinal direction thereof is constant along the longitudinal direction as shown in FIGS. 2 and 3.

In this example shown in FIGS. 2 and 3, the cross-sectional shape is rectangular, therefore, the above-mentioned flat surface portion 24 constitutes the entire radially inner surface Si2 of the protruding portion 22.

Such noise damper 20 can further exert the following effects in addition to the above-mentioned effect of the sponge material.

Figure 8A:
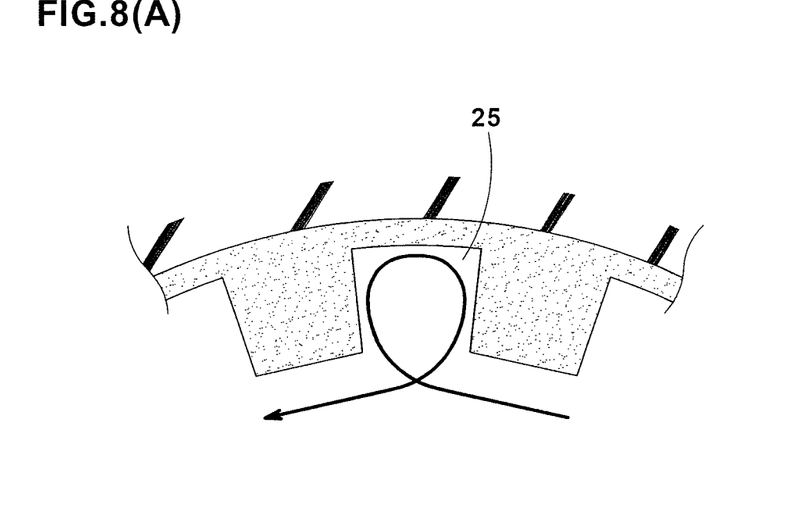
FIGS. 8(A) and 8(B) are schematic cross-sectional views for explaining the effects of protruding portions.

Since the rib-shaped protruding portions 22 of the noise damper 20 are arranged at intervals in the tire circumferential direction, a reentrant portion 25 is formed between every two of the circumferentially adjacent protruding portions 22.

when the air in the tire cavity flows in the tire circumferential direction, a part of the air enters the reentrant portions 25 as shown in FIG. 8(A), and comes out as a vortex flow from the reentrant portions 25. At this time, the air flowing in the circumferential direction is disturbed and the cavity resonance is suppressed.

Figure 8B:
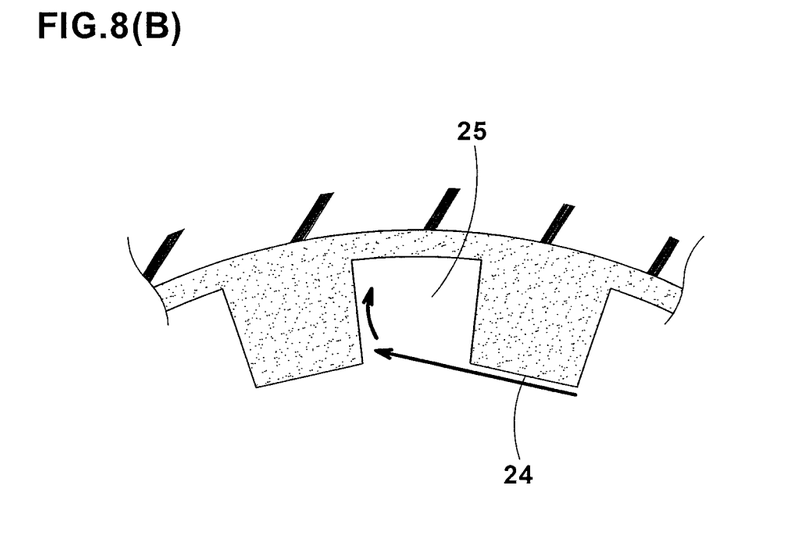
Figure 9A:
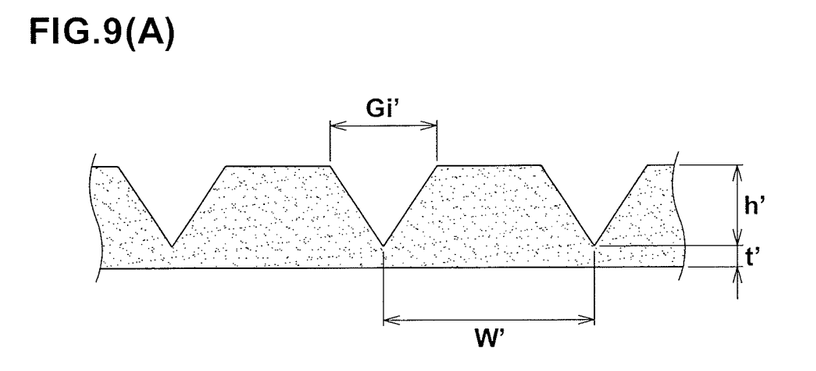
FIG. 9(A) is a cross sectional view of a noise damper as a comparative example before attached to the tire, taken along the longitudinal direction.
Figure 9B:
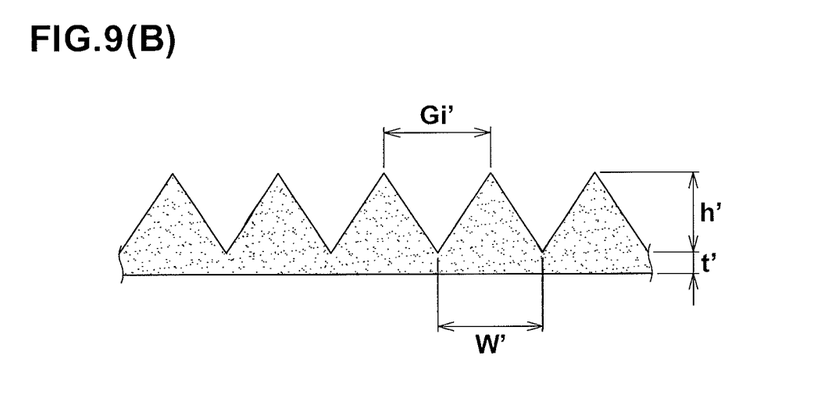
FIG. 9(B) is a cross sectional view of a noise damper as another comparative example before attached to the tire, taken along the longitudinal direction.

As shown in FIG. 8(B), the flat surface portion 24 of the protruding portion 22 guides a part of the air flowing in the tire circumferential direction to the reentrant portion 25, and make it easy for the part of the air to enter the reentrant portion 25. This further enhances the disturbing effect of air and suppresses the cavity resonance, thereby further improving the road noise reducing effect.

When the cross-sectional shape of the protruding portion 22 is rectangular as shown in FIG. 2, the spacing Go in the tire circumferential direction between the circumferentially adjacent protruding portions 22 measured at the radially outer ends becomes larger than the spacing Gi in the tire circumferential direction measured at the radially inner ends of the protruding portions 22. This makes the vortex flow more likely to occur in the reentrant portion 25. As the distance Go becomes decreased in comparison with the distance Gi, the vortex flow becomes less likely to occur.

Preferably, the distance Go at the radially outer ends is set in a range from 20 to 80 mm. If the distance Go is less than 20 mm, a vortex flow is unlikely to occur and the air disturbing effect is reduced. If the distance Go exceeds 80 mm, it becomes difficult to induce a vortex flow, and further the number of the protruding portions 22 and reentrant portions 25 is reduced, so the air disturbing effect is reduced.

The width w in the tire circumferential direction of the protruding portion 22 measured at the radially outer end is preferably set in a range from 0.8 to 1.2 times, more preferably 0.9 to 1.1 times the distance Go.

Preferably, the protruding portions 22 have a protruding height h in a range from 5 to 26 mm from the base portion 21 as shown in FIG. 2. If the protrusion height h is less than 5 mm, the vortex flow is difficult to occur and the air disturbing effect is reduced. If the protruding height h exceeds 26 mm, the protruding portions 22 tend to cause collapse and damage. More preferably, the protrusion height h is set to be not less than 10 mm, but not more than 20 mm.

It is preferable that the thickness t of the base portion 21 is set in a range from 2 to 15 mm. If the thickness t is less than 2 mm, the strength of the base portion 21 becomes insufficient, and the workability of attaching the noise damper 20 is deteriorated. If the thickness t exceeds 15 mm, the mass of the noise damper 20 is increased, which is disadvantageous to the fuel economy. Alternatively, if the thickness t is changed while keeping the mass of the noise damper unchanged, the protruding portion 22 can not secure a sufficient protruding height h and the air disturbing effect is reduced.

More preferably, the thickness t is set to be not less than 5 mm, but not more than 10 mm.

Figure 4A:
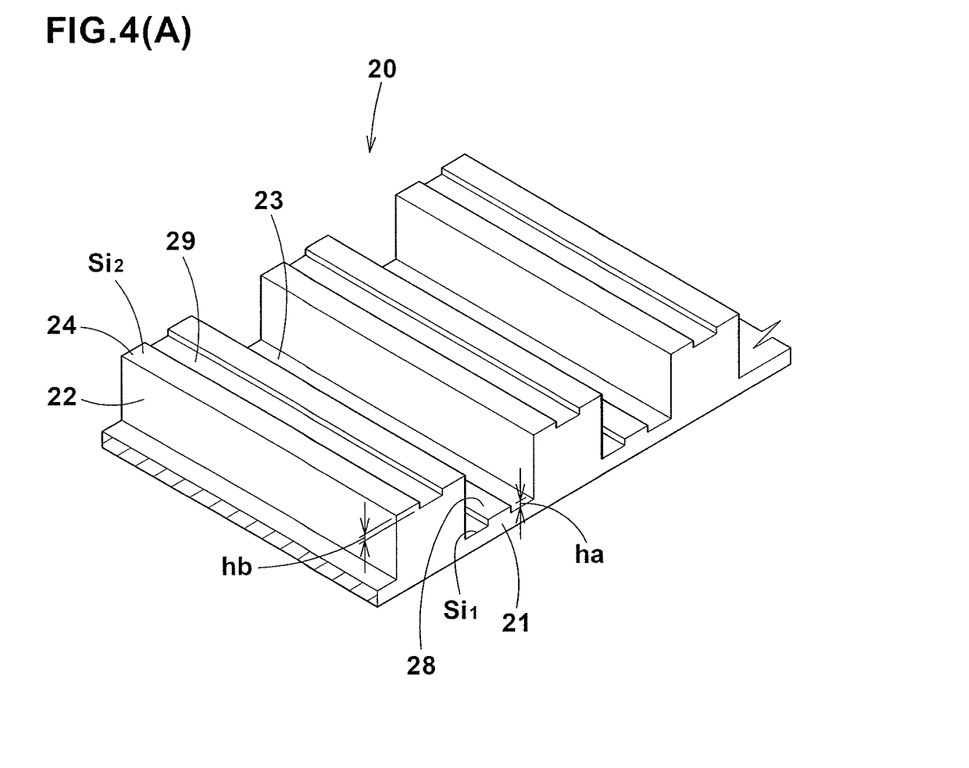
FIG. 4(A) is a perspective view of another example of the noise damper before attached to the pneumatic tire.
Figure 4B:
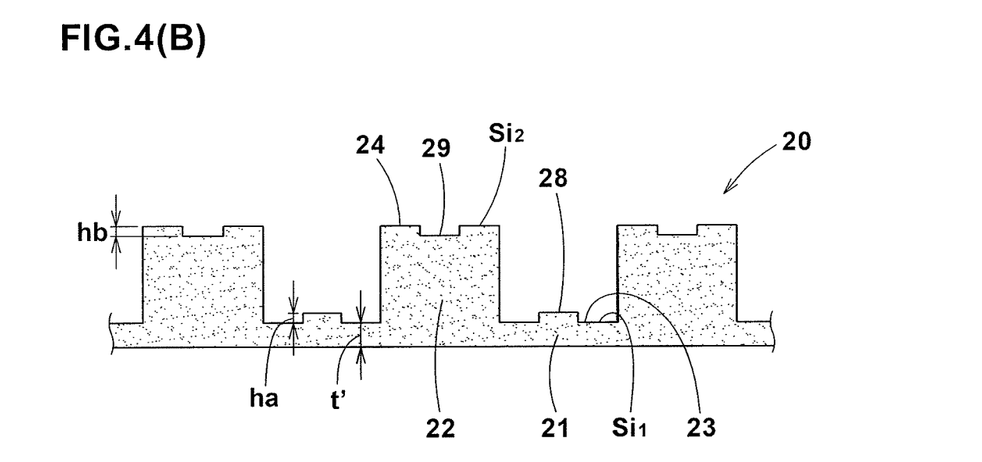
FIG. 4(B) is a cross sectional view thereof taken along the longitudinal direction.
Figure 5A:
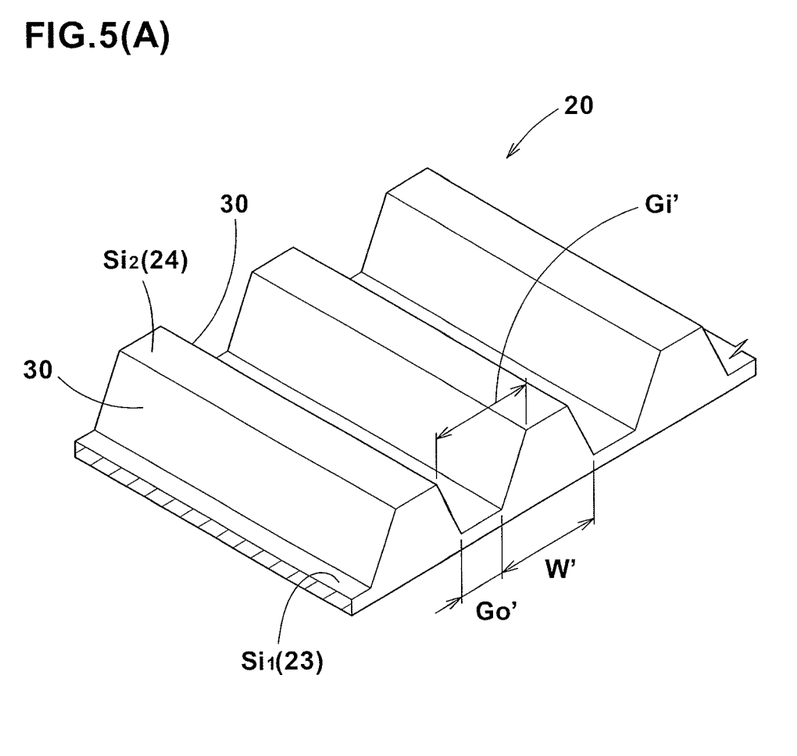
FIG. 5(A) is a perspective view of still another example of the noise damper before attached to the pneumatic tire.
Figure 5B:
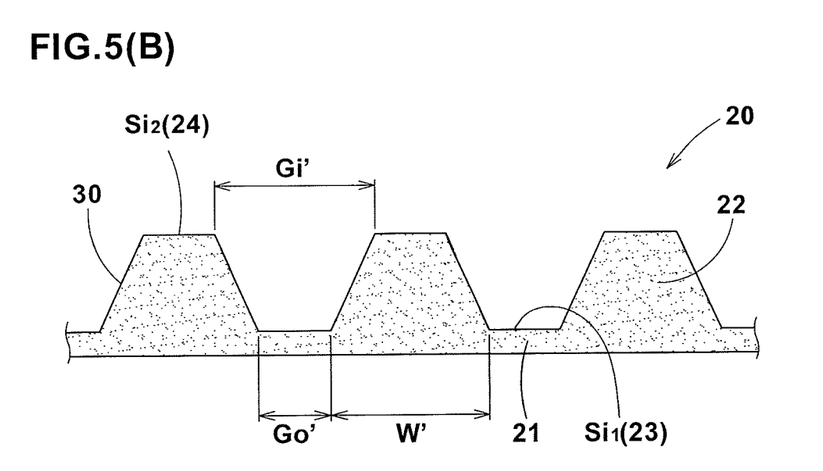
FIG. 5(B) is a cross sectional view thereof taken along the longitudinal direction.

Here, the distances Go and Gi, circumferential width w, projecting height h and thickness t are values measured in the state of the noise damper 20 which is attached to the pneumatic tire 1. The corresponding dimensions of the noise damper 20 alone before attached are expressed as the distances Go' and Gi', circumferential width w', protrusion height h' and thickness T' as shown in FIGS. 3, 4, and 5.

However, the following values before and after attachment to the tire are substantially equal to each other: distances Go and Go', circumferential widths w and w', projecting heights h and h', and thicknesses t and t', although the distances Gi and Gi' are different from each other.

As shown in FIG. 6(B), when the protruding portions 22 are inclined at an angle θ smaller than 90 degrees with respect to the tire circumferential direction, it is preferable that the angle θ is not less than 20 degrees, more preferably not less than 45 degrees. If the angle θ is less than 20 degrees, the air disturbing effect decreases.

Figure 6C:
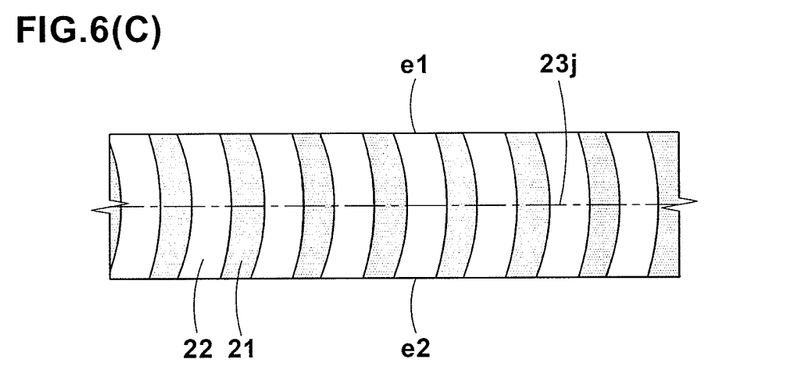

As shown in FIG. 6(c), the protruding portions 22 may be arcuately curved from the above-said one edge e1 to the other edge e2. In this case, it is preferable that the protruding portions 22 are arranged line-symmetrically about the widthwise center line 21j of the base portion 21. For example, the arcs are circular arcs whose centers lie on the widthwise center line 21j of the base portion 21.

FIGS. 4(A) and 4(B) show another example of the noise damper 20.

In this example, the radially inner surface Si1 of the base portion 21 is provided with small protrusions 28 each disposed between the protruding portions 22. In this case, the surface other than the small protrusion 28 constitutes the above-mentioned arc surface portion 23 of the radially inner surface Si1 of the base portion 21, Further, the radially inner surface Si2 of each protruding portion 22 is provided with a small reentrant portion 29. In this case, the surface other than the small reentrant portion 29 constitutes the above-said flat surface portion 24.

The height ha of the small protrusions 28 and the depth hb of the small reentrant portions 29 are preferably not more than 1.0 times, more preferably not more than 0.5 time the thickness t of the base portion 21.

FIGS. 5(A) and 5(B) show still another example of the noise damper 20.

In this example, the cross-sectional shape of the protruding portion 22 is trapezoidal, wherein the side surfaces 30 extend obliquely from the radially inner surface Si2 constituting the flat surface portion 24 to the radially inner surface Si1 constituting the arc surface portion 23.

It is also possible to connect between the radially inner surface Si2 and each side surface 30 with a smoothly arcuately curved surface, and connect between the radially inner surface Si1 and each side surface 30 and with a smoothly arcuately curved surface.

In this case, the distance Gi is determined based on the intersections of the imaginary extension lines of the radially inner surface Si2 and the side faces 30. The distance Go is determined based on the intersections of the imaginary extension lines of the radially inner surfaces Si1 and the side faces 30

In each of the noise dampers 20 shown in FIGS. 3(A) and 3(B), FIGS. 4(A) and 4(B) and FIGS. 5(A) and 5(B), the cross-sectional shape of the respective protruding portions 22 is the same as the cross-sectional shape of the respective reentrant portions 25.

Figure 7:
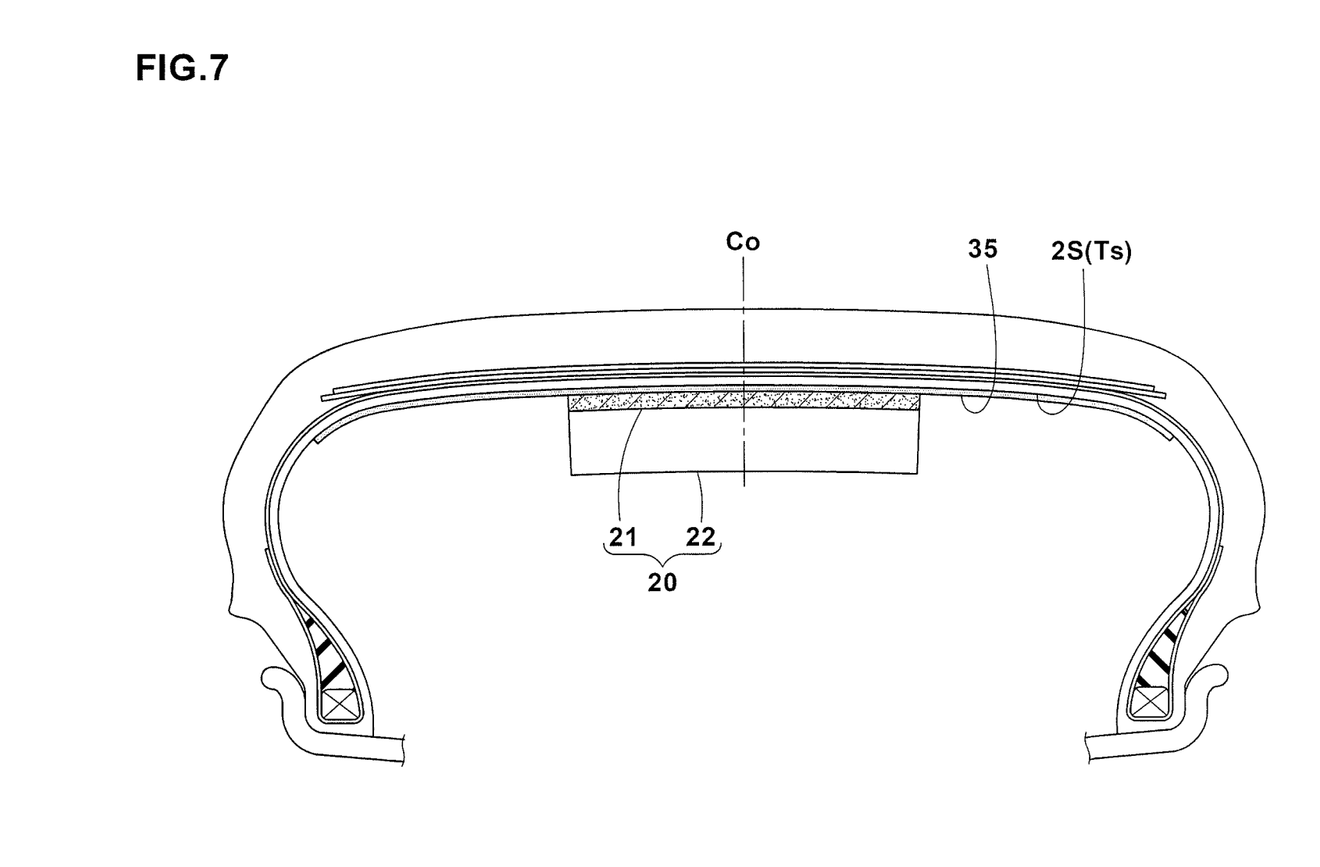
FIG. 7 is a meridian cross sectional view of a pneumatic tire with noise damper as another embodiment of the present invention.

FIG. 7 shows a pneumatic tire with noise damper T as another embodiment of the present invention.

As shown, the noise damper 20 is adhered to the radially inner surface 2s of the tread portion 2 via a puncture sealant layer 35 for preventing puncture. more specifically, the noise damper 20 is adhered by the use of the tackiness or adherence property of the puncture sealant instead of an adhesive agent. The puncture sealant layer 35 is applied so as to cover at least the radially inner surface 25 of the tread portion.

Therefore, it is possible to provide for the tire with a puncture sealing function without deteriorating the road noise reducing effect.

The puncture sealant layer 35 is made of a sealant material comprising a rubber component, a liquid polymer, and a crosslinking agent.

As to the rubber component, butyl base rubber compositions such as butyl rubber and halogenated butyl rubber can be used. As to the rubber component, a combination of the butyl base rubber composition and a diene base rubber composition may be used. In this case, from the viewpoint of flowability and the like, it is preferable that the content of the butyl rubber is not less than 90% by mass with respect to 100% by mass of the rubber component.

As to the liquid polymer, liquid polybutene, liquid polyisobutene, liquid polyisoprene, liquid polybutadiene, liquid poly α-olefin, liquid isobutylene, liquid ethylene α-olefin copolymer, liquid ethylene propylene copolymer, liquid ethylene butylene copolymer and the like are include. Among them, liquid polybutene is preferable from the viewpoint of the ability to add tackiness to the sealant material.

With respect to 100 parts by mass of the rubber component, the content of the liquid polymer is preferably not less than 50 parts by mass, more preferably not less than 100 parts by mass, but preferably not more than 400 parts by mass, more preferably not more than 300 parts by mass.

If less than 50 parts by mass, there is a possibility that the tackiness is lowered. If more than 400 parts by mass, there is a possibility that the sealant material flow during traveling.

As to the crosslinking agent, known chemicals can be used, but organic peroxides are preferred. By using the organic peroxide together with butyl rubber and the liquid polymer, the tackiness, sealing ability, fluidity and workability are improved.

The organic peroxides include:

acyl peroxides such as benzoyl peroxide, dibenzoyl peroxide and p-chlorobenzoyl peroxide;

peroxy esters such as 1-butyl peroxy acetate, t-butyl peroxybenzoate and t-butyl peroxy phthalate;

ketone peroxides such as methyl ethyl ketone peroxide;

alkyl peroxides such as di-t-butyl peroxybenzoate and 1,3-bis(1-butylperoxy isopropyl)benzene, hydroperoxide such as t-butyl hydroperoxide;

dicumyl peroxide;

t-butyl cumylperoxide and the like.

Among them, acyl peroxides are preferable from the viewpoints of the tackiness and fluidity. In particular, dibenzoyl peroxide is preferable.

with respect to 100 parts by mass of the rubber component, the content of the organic peroxide (crosslinking agent) is preferably not less than 0.5 parts by mass, more preferably not less than 1.0 part by mass, but preferably not more than 40 parts by mass, more preferably not more than 20 parts by mass.

If less than 0.5 parts by mass, the crosslinking density is lowered, and there is a possibility that flow of the sealant material occurs. If more than 40 parts by mass, the crosslinking density becomes high and the sealing property may decrease.

While detailed description has been made of preferable embodiments of the present invention, the present invention can be embodied in various forms without being limited to the illustrated embodiments.

Comparison Tests

By combining noise dampers having specification shown in Table 1 with pneumatic tires of size 215/55R17 having the identical structure shown in FIG. 1, pneumatic tires with noise damper were experimentally manufactured and tested for the road noise performance.

As to the material of the noise damper, a polyether/ester polyurethane sponge, namely, urethane foam formed from a mixture of polyether polyurethane and polyester polyurethane was used. The density thereof was 31 kg/cu·m.

For each noise damper, the width was 100 mm, and the average cross-sectional area obtained from the total volume was the same value of 15 sq·cm for all except for Comparative example Ref. 3 whose average cross-sectional area was 21 sq·cm.

Road Noise Performance Test

Each test tire was mounted on a rim of size 17×7.57 and inflated to 240 kPa, and run on a replica road surface formed around a tire test drum at a speed of 60 km/h and a tire load of 4.6 kN. During running, the noise sound was measured and the frequency spectrum was obtained. Then, the sound pressure level (dB) at a peak around 205 Hz, namely, the frequency of the tire cavity resonance was obtained.

The results are indicated in Table 1 by the differences from the sound pressure level (dB) of comparative example Ref. 1, wherein the larger the value, the lower the sound pressure level of the tire cavity resonance.

Durability Test

Using a tire test drum, each test tire was run at a speed of 100 km/h (tire pressure 240 kPa, tire load 4.6 kN), and the occurrence of cracks in the noise damper was visually checked every 4000 km running distance until the total running distance reached to 20000 km. If cracks were found, the test was ended and the accumulated running distance was recorded.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| noise damper | none | | | | | | | | | | |
| density (kg/cu · m) | — | 31 | 31 | 31 | 31 | 31 | 31 | 31 | 31 | 31 | 31 |
| end position *1 | — | — | base | base | base | base | prot | base | base | base | base |
| protruding portions | — | none | | | | | | | | | |
| sectional shape *2 | — | — | rect. | trap. | rect. | rect. | rect. | rect. | rect. | rect. | rect. |
| FIG. No. | | | 3 | 5 | 3 | 4 | 3 | 3 | 3 | 3 | 3 |
| arrangement | — | — | linear | linear | arc | linear | linear | linear | linear | linear | linear |
| FIG. No. | | | 6A | 6A | 6C | 6A | 6A | 6A | 6A | 6A | 6A |
| angle θ' (deg.) | — | — | 90 | 90 | 90 | 90 | 90 | 90 | 90 | 90 | 90 |
| distance Go' (mm) | — | — | 25 | 25 | 25 | 25 | 25 | 25 | 25 | 25 | 25 |
| distance Gi' (mm) | — | — | 25 | 25 | 25 | 25 | 25 | 25 | 25 | 25 | 25 |
| width W' (mm) | — | — | 25 | 25 | 25 | 25 | 25 | 25 | 25 | 25 | 25 |
| height h' (mm) | — | — | 20 | 20 | 20 | 20 | 20 | 26 | 15 | 10 | 5 |
| thickness t' (mm) | — | 15 | 5 | 5 | 5 | 5 | 5 | 2 | 7.5 | 10 | 12.5 |
| noise level difference | 0 | 3.1 | 6.0 | 5.9 | 5.9 | 6.1 | 6.0 | 6.4 | 5.6 | 5.3 | 4.9 |
| durability *3 | ok | ok | ok | ok | ok | ok | 4000 km | ok | ok | ok | ok |

TABLE 1-continued

| Tire | Ex. 10 | Ex. 11 | Ex. 12 | Ex. 13 | Ex. 14 | Ex. 15 | Ex. 16 | Ex. 17 | Ref. 3 | Ref. 4 |
|---|---|---|---|---|---|---|---|---|---|---|
| noise damper | | | | | | | | | | |
| density (kg/cu · m) | 31 | 31 | 31 | 31 | 31 | 31 | 31 | 31 | 31 | 31 |
| end position *1 | base | base | base | base | base | base | base | base | base | base |
| protruding portions | | | | | | | | | | |
| sectional shape *2 | rect. | rect. | rect. | rect. | rect. | rect. | rect. | rect. | trap. | triangle |
| FIG. No. | 3 | 3 | 3 | 3 | 3 | 3 | 3 | 3 | 9A | 9B |
| arrangement | linear | linear | linear | linear | linear | linear | linear | linear | linear | linear |
| FIG. No. | 6A | 6A | 6A | 6A | 6A | 6B | 6B | 6B | 6A | 6A |
| angle θ' (deg.) | 90 | 90 | 90 | 90 | 90 | 45 | 20 | 5 | 90 | 90 |
| distance Go' (mm) | 10 | 20 | 50 | 80 | 90 | 25 | 25 | 25 | 0 | 0 |
| distance Gi' (mm) | 10 | 20 | 50 | 80 | 90 | 25 | 25 | 25 | 10 | 25 |
| width W' (mm) | 10 | 20 | 50 | 80 | 90 | 25 | 25 | 25 | 25 | 25 |
| height h' (mm) | 20 | 20 | 20 | 20 | 20 | 20 | 20 | 20 | 20 | 20 |
| thickness t' (mm) | 5 | 5 | 5 | 5 | 5 | 5 | 5 | 5 | 5 | 5 |
| noise level difference | 4.5 | 5.0 | 5.7 | 5.4 | 4.7 | 5.8 | 5.7 | 4.5 | 3.3 | 3.6 |
| durability *3 | ok | ok | ok | ok | ok | ok | ok | ok | ok | ok |

*1 rect.; rectangle trap.: trapezoidal tri.; triangle
*2 positions of circumferential ends of noise damper base; base portion between two protruding portions prot: one of protruding portions
*3 ok: completed full distance of 20000 km without damage As shown in Table 1, it was confirmed that, according to the present invention, the tire cavity resonance sound is effectively reduced to improve the noise performance of the tire.

DESCRIPTION OF THE REFERENCE SIGNS 1 pneumatic tire
2s inner surface of tread portion
20 noise damper
21 base portion 21
j widthwise center line
22 protruding portion
23 arc surface portion
24 flat surface portion
25 reentrant portion
35 puncture sealant layer
e1 one edge
e2 other edge
Si1 radially inner surface
Si2 radially inner surface
So1 radially outer surface
T pneumatic tire with noise damper

The invention claimed is:

1. A pneumatic tire with noise damper comprising:
a pneumatic tire and
a noise damper made of a sponge material and attached onto an inner surface of a tread portion of the pneumatic tire so as to extend in the tire circumferential direction, wherein
the noise damper comprises a band-shaped base portion having a radially outer surface adhered to the inner surface of the tread portion, and a plurality of protruding portions protruding from the radially inner surface of the base portion,
the protruding portions form ribs extending continuously from one edge to the other edge of the base portion in the widthwise direction, and arranged at intervals in the tire circumferential direction,
in a cross section of the tire parallel with the tire equatorial plane,
the radially inner surface of the base portion includes arc surface portions concentric with the inner surface of the tread portion, and
the radially inner surface of each of the protruding portions includes a flat surface portion,
wherein each of the protruding portions extends from said one edge to said other edge while curving in an arcuate shape.

2. The pneumatic tire with noise damper according to claim 1, wherein
the distance in the tire circumferential direction between the protruding portions adjacent in the tire circumferential direction is 20 to 80 mm at the radially outer ends of the protruding portions.

3. The pneumatic tire with noise damper according to claim 2, wherein
each of the protruding portions has a rectangular cross-sectional shape in the cross section perpendicular to the longitudinal direction of the protruding portion.

4. The pneumatic tire with noise damper according to claim 1, wherein
each of the protruding portions has a rectangular cross-sectional shape in the cross section perpendicular to the longitudinal direction of the protruding portion.

5. The pneumatic tire with noise damper according to claim 1, wherein
the protruding height of the protruding portions from the base portion is in a range from 5 to 26 mm.

6. The pneumatic tire with noise damper according to claim 5, wherein
the thickness of the base portion is in a range from 2 to 15 mm.

7. The pneumatic tire with noise damper according to claim 1, wherein
the noise damper is attached to the inner surface of the tread portion via a puncture sealant layer for preventing tire puncture.

8. The pneumatic tire with noise damper according to claim 2, wherein
the noise damper is attached to the inner surface of the tread portion via a puncture sealant layer for preventing tire puncture.

9. The pneumatic tire with noise damper according to claim 3, wherein
the noise damper is attached to the inner surface of the tread portion via a puncture sealant layer for preventing tire puncture.

10. The pneumatic tire with noise damper according to claim 1, wherein
said arcuate shape is a circular arc shape.

11. A pneumatic tire with noise damper comprising:
a pneumatic tire and
a noise damper made of a sponge material and attached onto an inner surface of a tread portion of the pneumatic tire so as to extend in the tire circumferential direction, wherein
the noise damper comprises a band-shaped base portion having a radially outer surface adhered to the inner surface of the tread portion, and a plurality of protruding portions protruding from the radially inner surface of the base portion,
the protruding portions form ribs extending continuously from one edge to the other edge of the base portion in the widthwise direction, and arranged at intervals in the tire circumferential direction,
in a cross section of the tire parallel with the tire equatorial plane,
the radially inner surface of the base portion includes arc surface portions concentric with the inner surface of the tread portion, and
the radially inner surface of each of the protruding portions includes a flat surface portion,
wherein the radially inner surface of the base portion is provided with small protrusions each disposed between the protruding portions.

12. The pneumatic tire with noise damper according to claim 11, wherein
each of the protruding portions extends linearly from said one edge to said other edge at an angle θ of 20 to 90 degrees with respect to the tire circumferential direction.

13. The pneumatic tire with noise damper according to claim 11, wherein
each of the protruding portions extends from said one edge to said other edge while curving in an arcuate shape.

14. The pneumatic tire with noise damper according to claim 11, wherein
the noise damper is attached to the inner surface of the tread portion via a puncture sealant layer for preventing tire puncture.

15. The pneumatic tire with noise damper according to claim 11, wherein
the height of said small protrusion is not more than 1.0 times the thickness of the base portion.

16. A pneumatic tire with noise damper comprising:
a pneumatic tire and
a noise damper made of a sponge material and attached onto an inner surface of a tread portion of the pneumatic tire so as to extend in the tire circumferential direction, wherein
the noise damper comprises a band-shaped base portion having a radially outer surface adhered to the inner surface of the tread portion, and a plurality of protruding portions protruding from the radially inner surface of the base portion,
the protruding portions form ribs extending continuously from one edge to the other edge of the base portion in the widthwise direction, and arranged at intervals in the tire circumferential direction,
in a cross section of the tire parallel with the tire equatorial plane,
the radially inner surface of the base portion includes arc surface portions concentric with the inner surface of the tread portion, and
the radially inner surface of each of the protruding portions includes a flat surface portion,
wherein the radially inner surface of each of the protruding portions is provided with a small reentrant portion.

17. The pneumatic tire with noise damper according to claim 16, wherein
each of the protruding portions extends linearly from said one edge to said other edge at an angle θ of 20 to 90 degrees with respect to the tire circumferential direction.

18. The pneumatic tire with noise damper according to claim 16, wherein
each of the protruding portions extends from said one edge to said other edge while curving in an arcuate shape.

19. The pneumatic tire with noise damper according to claim 16, wherein
the noise damper is attached to the inner surface of the tread portion via a puncture sealant layer for preventing tire puncture.

20. The pneumatic tire with noise damper according to claim 16, wherein
the depth of said small reentrant portion is not more than 1.0 times the thickness of the base portion, and
said small reentrant portion extends over the entire length of the protruding portion in said widthwise direction.

* * * * *